(12) United States Patent
Endo et al.

(10) Patent No.: US 7,117,073 B2
(45) Date of Patent: Oct. 3, 2006

(54) PARKING-ASSIST DEVICE AND REVERSING-ASSIST DEVICE

(75) Inventors: Tomohiko Endo, Toyota (JP); Hisashi Satonaka, Susono (JP); Yuichi Kubota, Okazaki (JP); Akira Matsui, Toyota (JP); Hideyuki Iwakiri, Tajimi (JP); Toru Sugiyama, Toyota (JP); Seiji Kawakami, Susono (JP); Katsuhiko Iwazaki, Shizuoka-ken (JP); Hiroaki Kataoka, Susono (JP); Yuu Tanaka, Aichi-ken (JP); Yoshifumi Iwata, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 105 days.

(21) Appl. No.: 10/895,332

(22) Filed: Jul. 21, 2004

(65) Prior Publication Data

US 2005/0043871 A1    Feb. 24, 2005

(30) Foreign Application Priority Data

Jul. 23, 2003    (JP)    ............................. 2003-278533

(51) Int. Cl.
G06F 19/00    (2006.01)
B60Q 1/48    (2006.01)

(52) U.S. Cl. ...................... 701/28; 340/932.2; 348/118
(58) Field of Classification Search ...................... None
See application file for complete search history.

(56) References Cited

U.S. PATENT DOCUMENTS 5,957,232 A    9/1999    Shimizu et al.
6,424,895 B1*    7/2002    Shimizu et al. ................ 701/41
6,704,653 B1*    3/2004    Kuriya et al. ................ 701/301
6,919,822 B1*    7/2005    Tanaka et al. ........... 340/932.2

FOREIGN PATENT DOCUMENTS

| EP | 1 065 642 | 1/2001 |
|---|---|---|
| EP | 1 327 559 | 7/2003 |
| EP | 1 332 948 | 8/2003 |
| JP | 11-208420 | 8/1999 |
| JP | 2001-322493 | 11/2001 |
| JP | 2002-240661 | 8/2002 |
| JP | 2002-267479 | 9/2002 |
| JP | 2003-034206 | 2/2003 |
| JP | 2003-172622 | 6/2003 |
| JP | 2003-205809 | 7/2003 |
| JP | 2004-284370 | 10/2004 |

* cited by examiner

Primary Examiner—Michael J. Zanelli
(74) Attorney, Agent, or Firm—Finnegan, Henderson, Farabow, Garrett & Dunner, LLP.

(57) ABSTRACT

A parking-assist device for an automotive vehicle comprises an imaging unit which creates an image of an exterior behind the vehicle. A target-parking-position input unit inputs a target parking position to park the vehicle when requested. A target-parking-position memory access unit stores the target parking position and reads the stored target parking position when requested. A vehicle-travel-amount detection unit detects an amount of travel of the vehicle. A parking-route determining unit calculates a parking route from a current position of the vehicle to the target parking position. A display unit displays the created image and displays one of the target parking position inputted and the stored target parking position read on the created image in a superimposed manner.

5 Claims, 12 Drawing Sheets

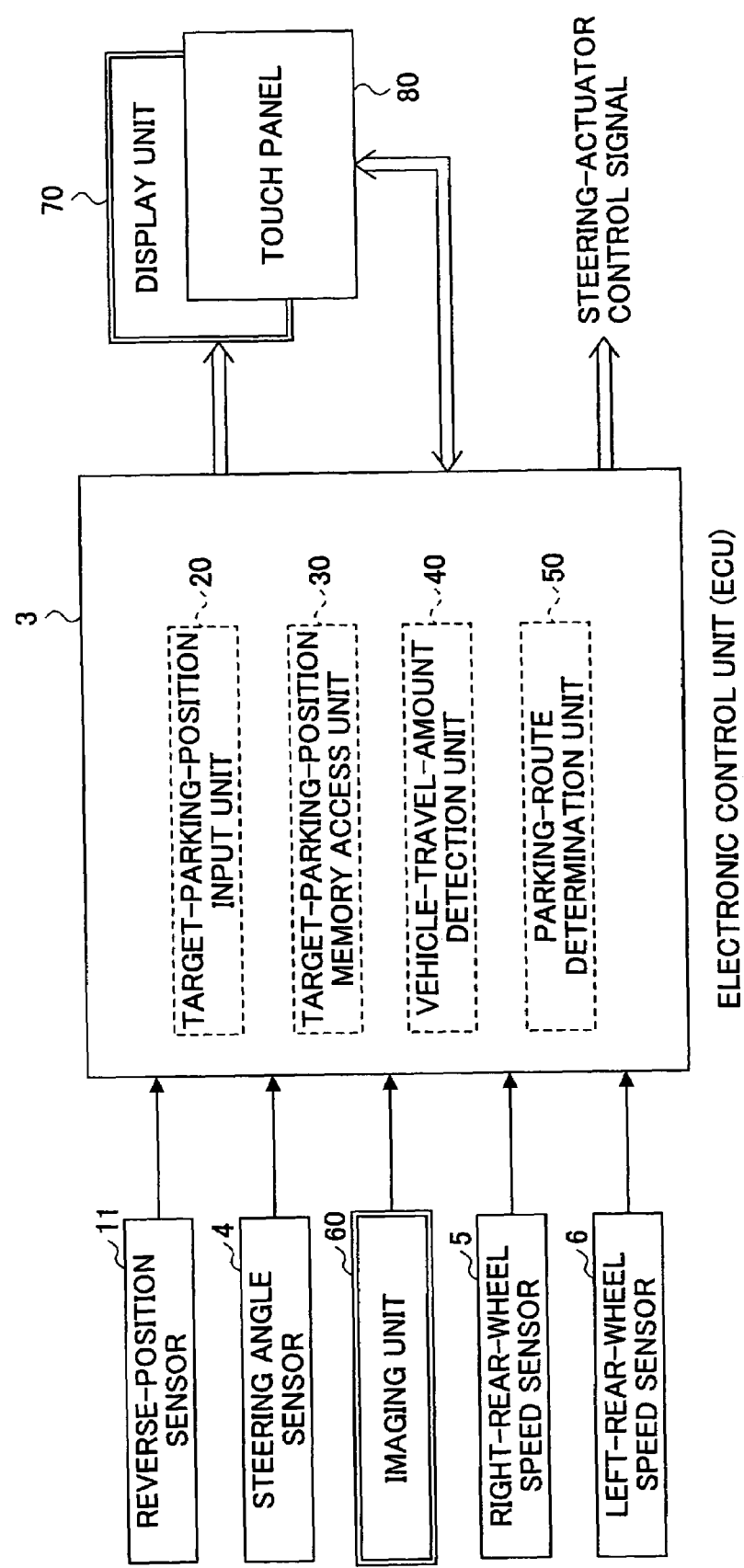

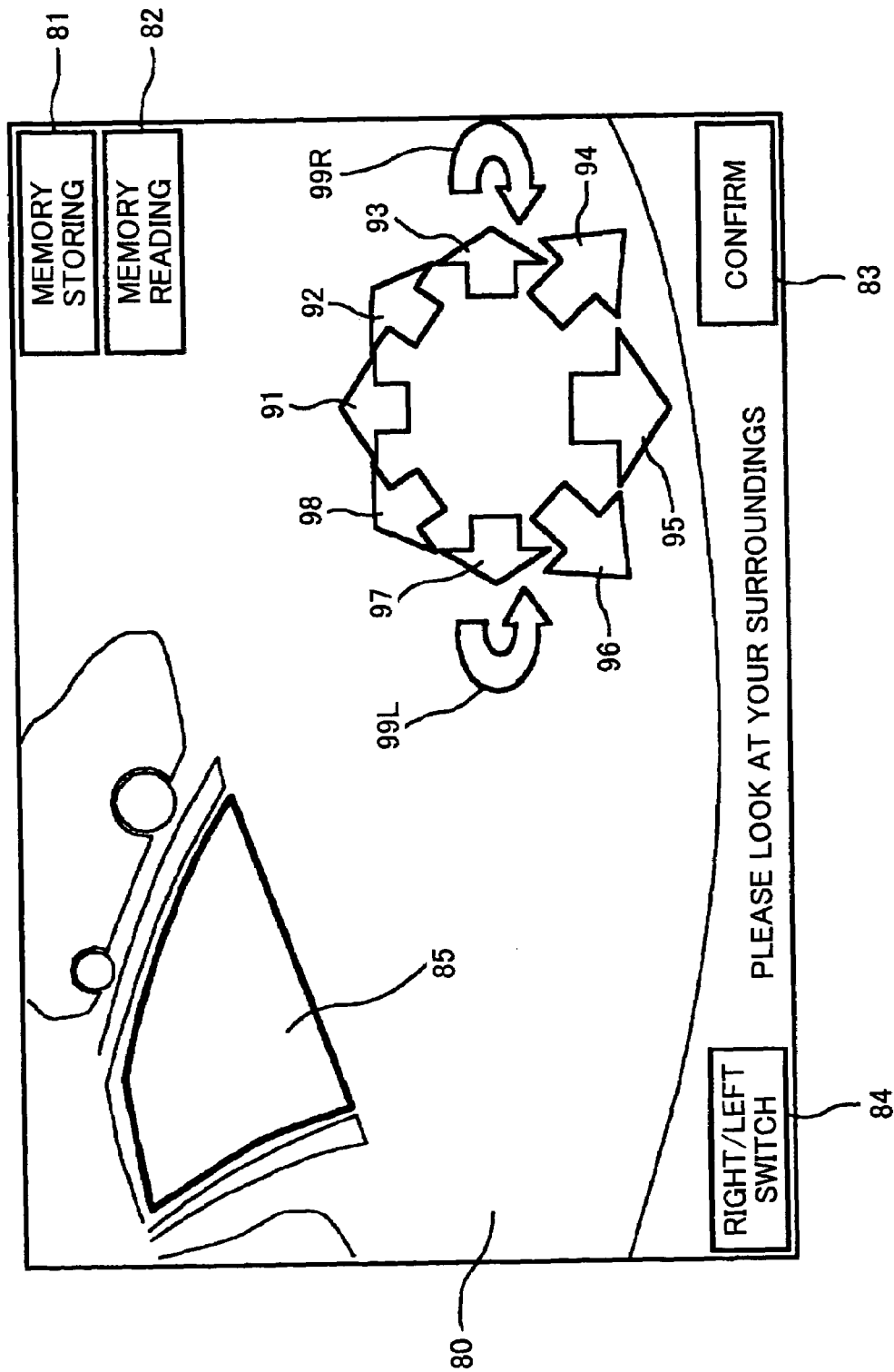

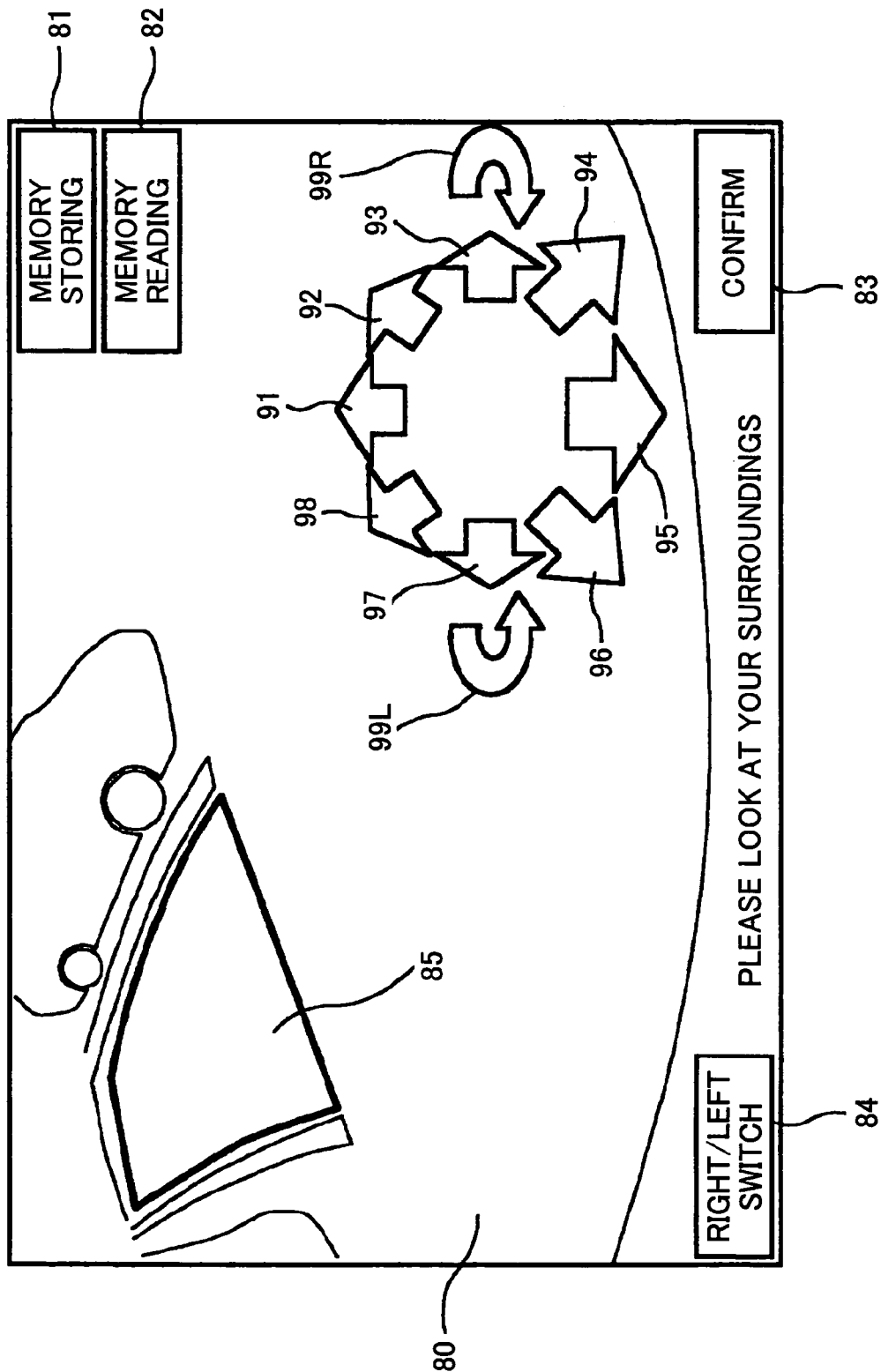

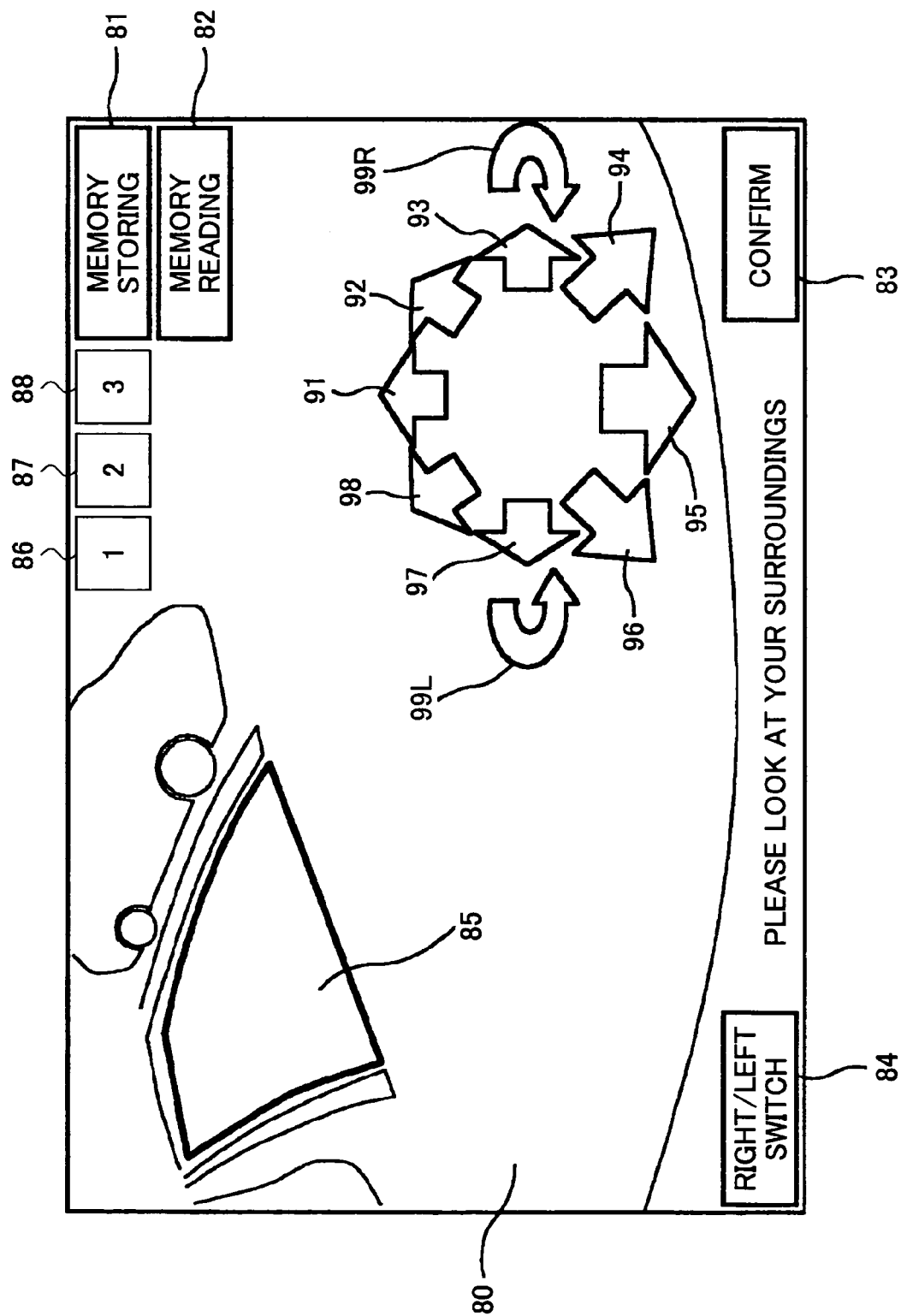

PARKING-ASSIST DEVICE AND REVERSING-ASSIST DEVICE

CROSS-REFERENCE TO RELATED APPLICATION

This application is based upon and claims the benefit of priority from the prior Japanese application No. 2003-278533, filed on Jul. 23, 2003, the entire contents of which are incorporated herein by reference.

BACKGROUND OF THE INVENTION

1. Field of the Invention

The present invention relates to a parking-assist device which is provided for assisting a driver of an automotive vehicle in performing garage parking, column parking, etc. Moreover, the present invention relates to a reversing-assist device which is provided for assisting the driver of the vehicle in performing the operation to make the course change at a three-pronged road or an intersection with a narrow road width and little traffic.

2. Description of the Related Art

It is often difficult for the beginners to perform garage parking, column parking, etc. Especially, the beginners are often not good at maneuvering the vehicle into the garage. To obviate the problem, a parking-assist device for assisting the operation in the case of parking the vehicle has been created.

For example, Japanese Laid-Open Patent Application No. 11-208420 discloses a parking auxiliary system which may be considered the parking-assist device of the above type.

In the parking auxiliary system, an image of a target parking region from the side of the target parking position is created, and a target parking region which is obtained by the computation is superimposed on the created image, so that the driver of the vehicle is guided to the target parking position.

In the parking auxiliary system disclosed in Japanese Laid-Open Patent Application No. 11-208420, if the vehicle steps on the curbstone in front of the garage after the vehicle assisting is started, then the vehicle assisting is terminated by the shock etc. regardless of the operator's intention. Thus, if the parking assisting is interrupted regardless of the operator's intention, the operator wishes to resume the execution of the parking assist from the interrupted position in many cases.

However, in the parking auxiliary device disclosed in Japanese Laid-Open Patent Application No. 11-208420, the vehicle movement route is computed based on only the relative positions of the vehicle where the image of the target parking region from the side thereof is created and the target parking region. If the parking assist is interrupted, the execution of the parking assisting cannot be resumed unless the vehicle is again moved back to the side of the target parking position after stopping, and the time and efforts will become wasteful.

In order to overcome the problem, Japanese Patent Application No. 2002-014794 (which is assigned to the assignee of this application and corresponds to Japanese Laid-Open Patent Application No. 2003-212073) discloses a parking-assist device. In this parking-assist device, when resuming the parking assist after the parking assist is started and interrupted, the target parking position at the time of resuming is computed based on the target parking position previously set before the parking assist is resumed, and the computed target parking position at the time of resuming is taken as a default display position of the target parking frame at the time of resetting the target parking position, and displayed on the screen of the display unit.

In the above-described parking-assist device, at the time of resetting the target parking position, the computed target parking position is displayed on the screen of the display unit as a default display position of the target parking frame at the time of resetting. It is possible to take the position corresponding to the target parking position or the nearby position as the default display position of the target parking frame. Therefore, it is not necessary to move the target parking frame greatly when setting the target parking position, and the target parking position can be set up easily and the parking assisting can be resumed at an early stage.

Moreover, another conventional parking-assist device is known. In the known parking assist device, the imaginary display indication which indicates the target parking position of the self-vehicle is superimposed on the camera image, and the target-parking-position display indication is moved on the camera image by using the position adjustment unit.

In this case, after the setting of the target parking position is performed, the calculation of the parking route is performed. The automatic parking control is performed using the operator guidance to the driver or the steering/control unit so as to meet the parking route.

However, in the above-mentioned parking-assist devices, the target-parking-position display indication is moved only with the position adjustment unit, and the operation of setting the target parking position is needed for every time of parking, and the operation is troublesome. Thus, the ease of operation deteriorates.

SUMMARY OF THE INVENTION

An object of the present invention is to provide an improved parking-assist device in which the above-mentioned problems are eliminated.

Another object of the present invention is to provide a parking-assist device which improves the ease of operation by reading the previously recorded target-parking-position information under the parking conditions using the same target parking position and the same parking starting position as in the driver's residence, thereby reducing the number of times of operation.

Another object of the present invention is to provide a reversing-assist device which improves the ease of operation by reading the previously recorded target-reversing-position information under the reversing conditions using the same target reversing position and the same reversing starting position as in the driver's residence, thereby reducing the number of times of operation.

The above-mentioned objects of the present invention are achieved by a parking-assist device for an automotive vehicle, comprising: an imaging unit which creates an image of an exterior behind the vehicle; a target-parking-position input unit which inputs a target parking position to park the vehicle when requested; a target-parking-position memory access unit which stores the target parking position and reads the stored target parking position when requested; a vehicle-travel-amount detection unit which detects an amount of travel of the vehicle; a parking-route determining unit which calculates a parking route from a current position of the vehicle detected by the vehicle-travel-amount detection unit to the target parking position; and a display unit which displays the image created by the imaging unit and displays one of the target parking position inputted by the targetparking-position input unit and the stored target parking position read by the target-parking-position memory access unit on the created image in a superimposed manner, so that an operator on the vehicle is guided to the target parking position according to the parking route.

Here, the imaging unit should just have the capacity which creates an image of an external rear view of the vehicle, although it can be used without the exception of the wide angle lens or the standard lens, the CCD camera with the standard lens etc. is usually used. In addition, the compensation is needed when the wide angle lens etc. is used.

The target-parking-position memory access unit is provided so that the target parking position inputted by the target-parking-position input unit and displayed at the given position of the display can be freely stored in the memory by the stick operation, the key stroke, or the touch operation on the screen.

Moreover, the target-parking-position memory access unit is provided so that the stored target parking position can be read from the memory by the stick operation, the key stroke, or the touch operation on the screen. Of course, the target-parking-position memory access unit may have the capability of recording the target parking position in the memory at multiple times (updating registration).

Since the vehicle-travel-amount detection unit is used for judging whether movement of the vehicle is detected, the parking route from the current position to the target parking position is determined, and on-going vehicle are in the proper position, although what can detect the exact handle position of vehicle and the position of the wheel is suitable for it, fundamentally, it should just be the vehicle speed sensor arranged in both wheels at least.

Although the parking route from the current position of the vehicle detected by the vehicle-travel-amount detection unit to the target parking position is calculated and the microcomputer usually performs, if the parking route determining unit is the arithmetic circuit which can calculate the path from the current position of vehicle to the target parking position, it will not be exceptionally limited to the microcomputer.

The display unit should just have the function which specifically displays the image created by the usual imaging unit, and the function which indicates the target parking position set as the created image by the target-parking-position input unit or the target-parking-position memory access unit by the superposition, although the liquid crystal display, the EL display, etc. are used.

Namely, the target parking position set up by the target-parking-position input unit or the target-parking-position memory access unit draws drawing on the transparent background in respect of the line, and should just pile up the line or the field view with the image created by the imaging unit.

Therefore, what is necessary is just the liquid crystal display, the EL display, etc. which have the mixer function. Moreover, the image mixer function, the liquid crystal display, and the EL display may be put together.

The parking-assist device of the present invention may be configured so that the target-parking-position memory access unit is provided to have a plurality of storage regions to store target-parking-position information, and the target-parking-position memory access unit stores the target parking position selectively in one of the plurality of storage regions if requested, and reads the target parking position from the storage region concerned.

Specifically, it has two or more memory storages, and it is matched with two or more area of the touch panel, and by the key stroke concerned, the target parking position can be stored or those memory storages just read the storage to two or more memory storages.

The above-mentioned objects of the present invention are achieved by a reversing-assist device for an automotive vehicle, comprising: an imaging unit which creates an image of an exterior behind the vehicle; a target-reversing-position input unit which inputs a target reversing position to reverse the vehicle when requested; a target-reversing-position memory access unit which stores the target reversing position and reads the stored target reversing position when requested; a vehicle-travel-amount detection unit which detects an amount of travel of the vehicle; a reversing-route determining unit which calculates a reversing route from a current position of the vehicle detected by the vehicle-travel-amount detection unit to the target reversing position; and a display unit which displays the image created by the imaging unit and displays one of the target reversing position inputted by the target-reversing-position input unit and the stored target reversing position read by the target-reversing-position memory access unit on the created image in a superimposed manner, so that an operator of the vehicle is guided to the target reversing position according to the reversing route.

Here, the imaging unit should just have the capacity which creates an image of an external rear view of the vehicle, although it can be used without the exception of the wide angle lens or the standard lens, the CCD camera with the standard lens etc. is usually used. In addition, the compensation is needed when the wide angle lens etc. is used.

The target-reversing-position memory access unit is provided so that the desired reversing target position inputted by the target-reversing-position input unit and displayed at the given position of the display can be freely stored in the memory by the stick operation, the key stroke, or the touch operation on the screen.

Moreover, the target-reversing-position memory access unit is provided so that the stored reversing target position can be read from the memory by the stick operation, the key stroke, or the touch operation on the screen. Of course, the target-reversing-position memory access unit may have the capability of recording the target reversing position in the memory at multiple times (updating registration).

Since the vehicle-travel-amount detection unit is used for judging whether reversing movement of the vehicle is detected, the reversing route from the current position to the reversing target position is determined, and the vehicle under reversing are in the proper position, although what can detect the exact handle position of vehicle and the position of the wheel is suitable for it, fundamentally, it should just be the vehicle speed sensor arranged in both wheels at least.

Although the reversing route from the current position of the vehicle detected by the vehicle-travel-amount detection unit to the reversing target position is calculated and the microcomputer usually performs, if the reversing route determining unit is the arithmetic circuit which can calculate the path from the current position of vehicle to the reversing target position, it will not be exceptionally limited to the microcomputer.

What is necessary is for the display unit just to have the function which indicates the reversing route from the vehicle position calculated with the reversing route determining unit to the reversing target position by the superposition based on the reversing target-position information set as the function which specifically displays the image created by the usual imaging unit, and its created image by the target-reversingposition input unit or the reversing target-position storage unit, although the liquid crystal display, the EL display, etc. are used.

Namely, the reversing route from the vehicle position calculated with the reversing route determining unit based on the reversing target-position information set up by the target-reversing-position input unit or the reversing target-position storage unit to the reversing target position draws drawing on the transparent background in respect of the line, and should just pile up the line or the field view with the image created by the imaging unit.

Therefore, what is necessary is just the liquid crystal display, the EL display, etc. which have the mixer function.

According to the parking-assist device of the present invention, if it sets the target parking position which parks the vehicle by the target-parking-position input unit as the parking route determining unit, the parking route determining unit will calculate the parking route from the current position of the vehicle detected by the vehicle-travel-amount detection unit to the target parking position.

While displaying the image created by the imaging unit which creates an image of an external rear view of the vehicle, the display unit displays the image of the target parking position inputted by the target-parking-position input unit on the created image in a superimposed manner, so that the driver on the vehicle is guided according to the parking route from the vehicle position to the target parking position. Automatic steering operation is performed if requested.

Moreover, since the target parking position is set up from the same parking starting position to the garage of the house, and the parking lot of the office, in such a parking position, if requested, the target parking position is beforehand stored to the target-parking-position memory access unit, the stored target parking position concerned is read, the target parking position stored by the target-parking-position memory access unit is set as the parking route determining unit, and the parking route from the current position of the vehicle detected by the vehicle-travel-amount detection unit to the target parking position is calculated by the parking route determining unit.

While displaying the image acquired by the imaging unit which creates an image of an external rear view of the vehicle by the display unit, the target parking position stored by the image at the target-parking-position memory access unit is indicated by the superposition, and garage parking is guided according to the parking route from the vehicle position to the target parking position. Automatic steering operation is performed if requested.

Thus, in the parking conditions which serve as the same target parking position and the same parking starting position like the garage of the house, and the parking lot of the office, by reading the target-parking-position information on past, the number of times of operation of the parking-assist device can be reduced, and the ease of operation can be improved.

The target-parking-position memory access unit of the parking-assist device of the present invention has the storage region of two or more target-parking-position information, choose the storage region concerned, and the target parking position is stored.

Since it is characterized by the ability to read alternatively the stored target parking position if requested, and set it up freely, like the garage of the house, and the parking lot of the office.

In the parking conditions using the same parking starting position and the same target parking position, or like the supermarket, by making two or more parking positions stored beforehand, the target parking position stored according to the selected target parking position can be read alternatively, and can be set up, the number of times of operation of the parking-assist device can be reduced, and the ease of operation can be improved.

According to the reversing-assist device of the present invention, at a three-pronged road or an intersection without the signal with narrow road width, if the vision is good, the reversing target position to reverse the vehicle is set to the reversing route determining unit by the target-reversing-position input unit. The reversing route determining unit calculates directly the reversing route from the current position of the vehicle detected by the vehicle-travel-amount detection unit to the reversing target position on the spot.

While displaying the image created by the imaging unit which creates an image of an external rear view of the vehicle, the display unit displays the image of the reversing target position inputted by the target-reversing-position input unit on the created image in a superimposed manner, so that the driver on the vehicle is guided according to the reversing route from the vehicle position to the reversing target position. Automatic steering operation is performed if requested.

Moreover, for a three-pronged road or an intersection with the limited vision, the reversing target position is beforehand stored in the reversing target-position storage unit. The stored reversing target position concerned is read if requested, the reversing target position stored in the reversing target-position storage unit is set to the reversing route determining unit, and the reversing route from the current position of the vehicle detected by the vehicle-travel-amount detection unit to the reversing target position is calculated with the reversing route determining unit.

While displaying the image created by the imaging unit, which creates an image of an external rear view of the vehicle, the display unit displays the image of the reversing target position stored in the reversing target-position storage unit on the created image in a superimposed manner, and the course is changed by reversing the vehicle according to the reversing route from the vehicle position to the reversing target position.

Thus, when changing the course at a three-pronged road or an intersection without the signal with narrow road width, if the vision is good, the reversing target position to reverse the vehicle is directly inputted to the reversing route determining unit by using the target-reversing-position input unit on the spot.

Even if the vision is good, when changing the course under the conditions in which the repeated turning is performed, the previously recorded reversing target-position information is read out, and the number of times of operation of the reversing-assist device can be reduced, and the ease of operation can be improved.

Moreover, for a three-pronged road or an intersection with the limited vision, the similar layout is formed superficially in other places, and the reversing target position for it is stored beforehand in the reversing target-position storage unit. By reading the stored reversing target position concerned, the reversing target position stored in the reversing target-position storage unit is set to the reversing route determining unit, and using the information, the number of times of operation of the reversing-assist device can be reduced, and the ease of operation can be improved.

BRIEF DESCRIPTION OF THE DRAWINGS

Other objects, features and advantages of the present invention will be apparent from the following detailed description when read in conjunction with the accompanying drawings.

FIG. 2 is a block diagram showing the functional composition of an electronic control unit in the vehicle in which a preferred embodiment of the parking-assist device of the invention is incorporated.

FIG. 4 is a diagram showing the screen indication of a display unit and a touch panel of the parking-assist device in the present embodiment.

FIG. 8A is a diagram showing the screen indication of the touch panel used by the parking-assist device in the present embodiment when the setting of the target parking position is performed at a time.

FIG. 8B is a diagram showing the screen indication of the touch panel used by the parking-assist device in the present embodiment when the setting of the target parking position is performed at multiple times.

DETAILED DESCRIPTION OF PREFERRED EMBODIMENTS

A description will now be provided of the preferred embodiments of the present invention with reference to the accompanying drawings.

Figure 1:
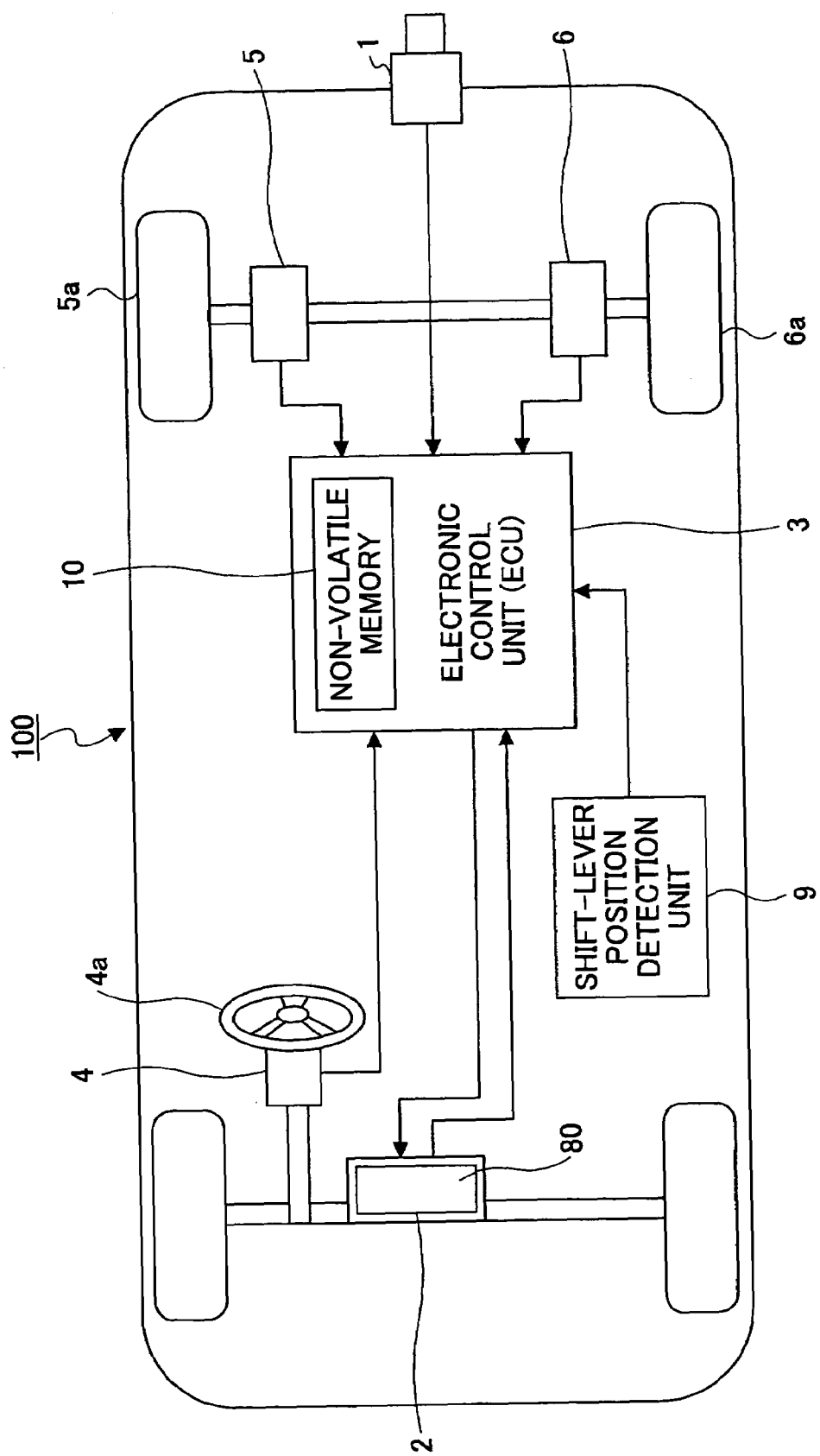
FIG. 1 is a diagram showing the composition of an automotive vehicle in which the parking-assist device or reversing-assist device of the invention is embodied.

FIG. 1 shows the composition of an automotive vehicle in which the parking-assist device or reversing-assist device of the invention is embodied. FIG. 2 shows the functional composition of an electronic control unit in the vehicle in which a preferred embodiment of the parking-assist device of the invention is incorporated.

Figure 3A:
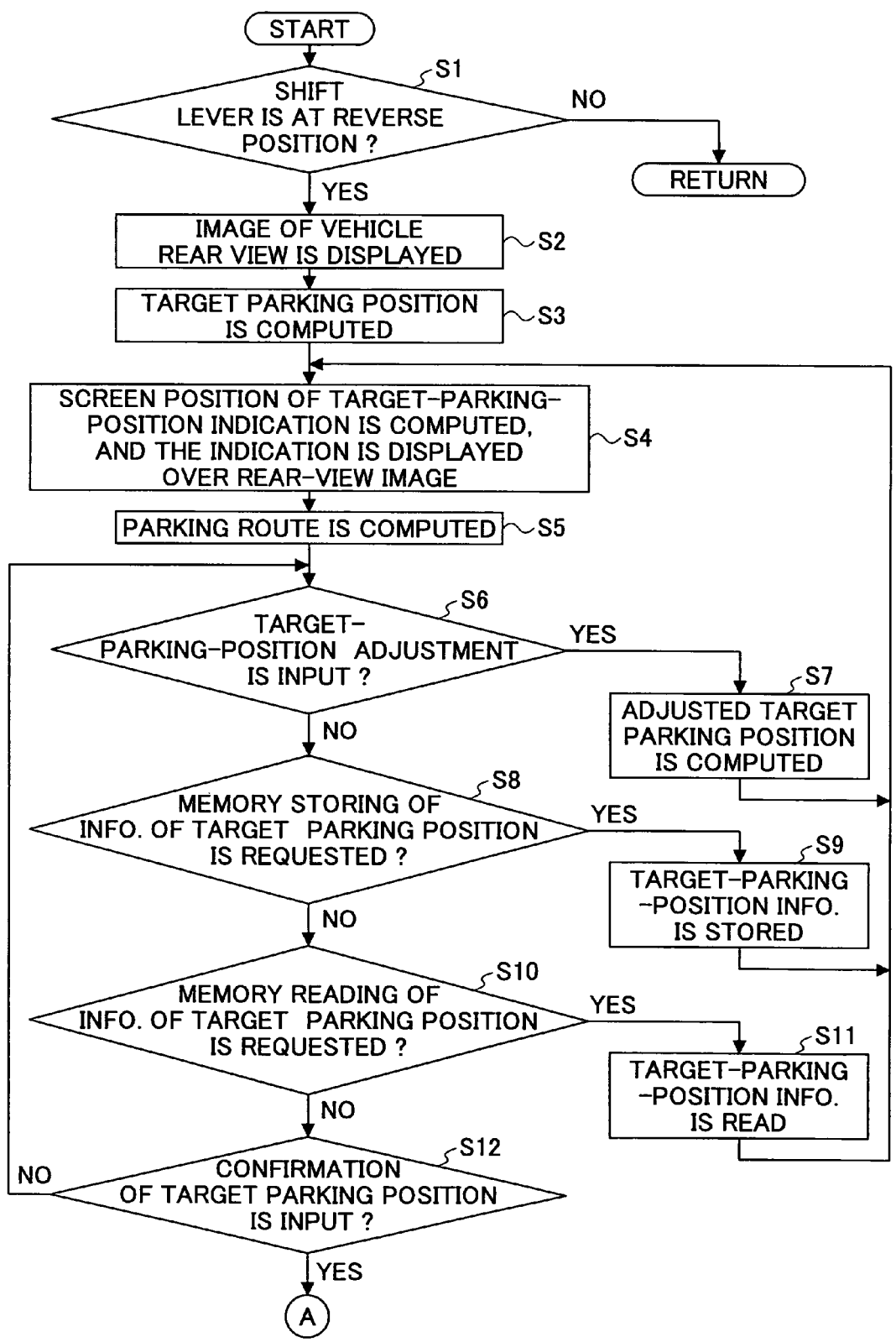
FIG. 3A and FIG. 3B are a flowchart for explaining the parking assist control procedure executed by the electronic control unit in the present embodiment.
Figure 3B:
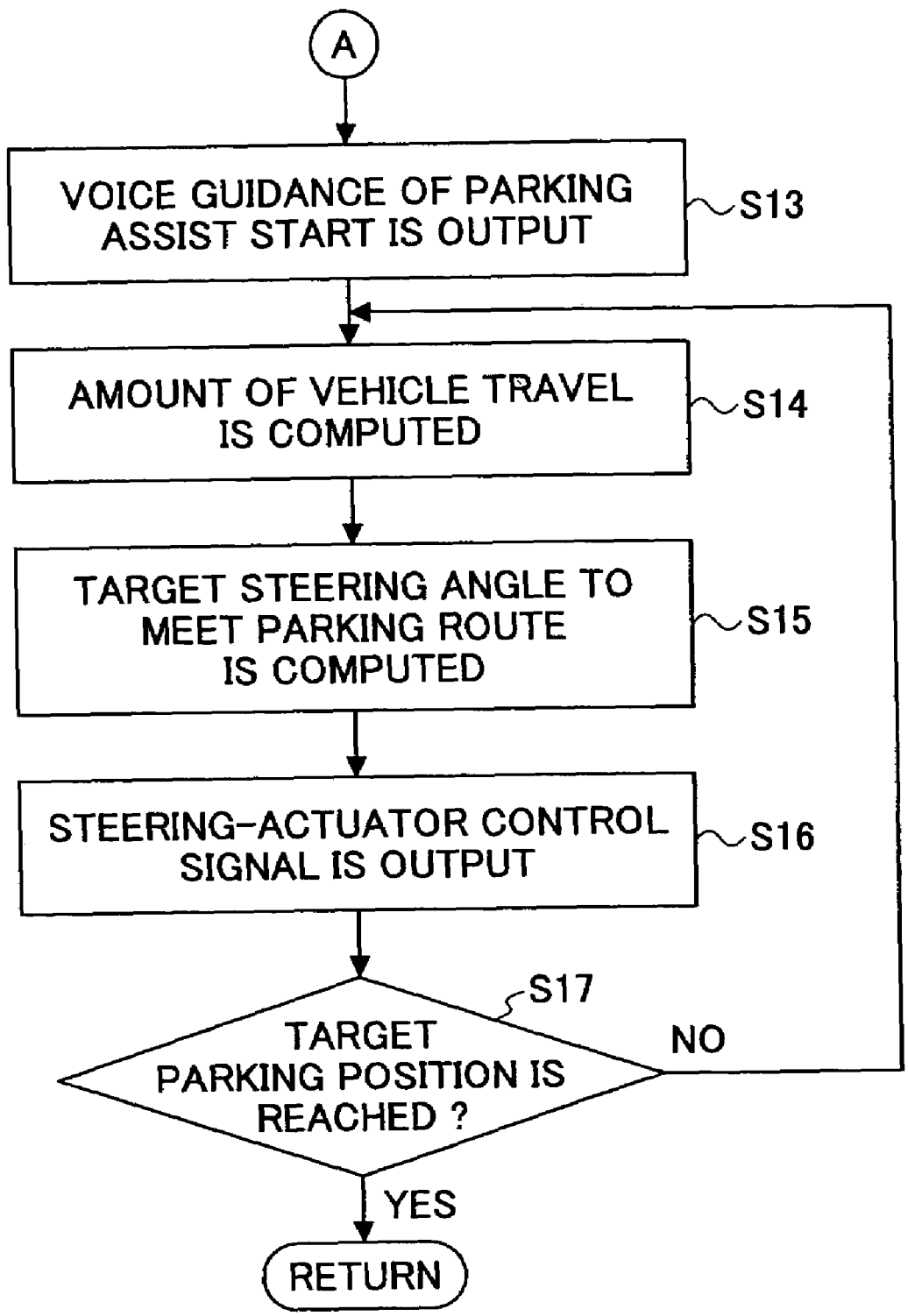
Figure 5:
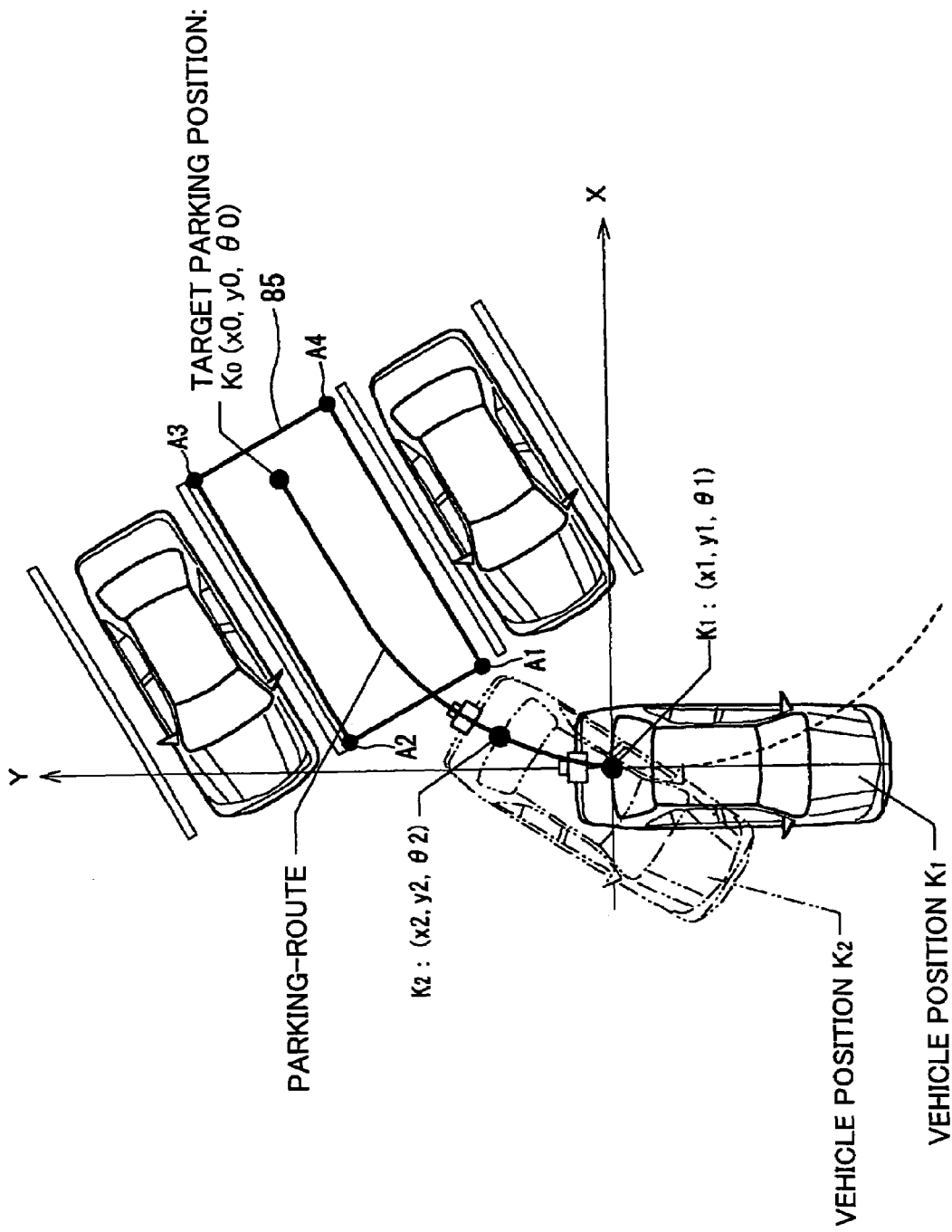
FIG. 5 is a diagram for explaining the parking route used by the parking-assist device in the present embodiment.

Moreover, FIG. 3A and FIG. 3B are a flowchart for explaining the parking assist control procedure executed by the electronic control unit in the present embodiment. FIG. 4 shows the screen indication of a display unit and a touch panel of the parking-assist device in the present embodiment. FIG. 5 is a diagram for explaining the parking route used by the parking-assist device in the present embodiment.

Figure 6:
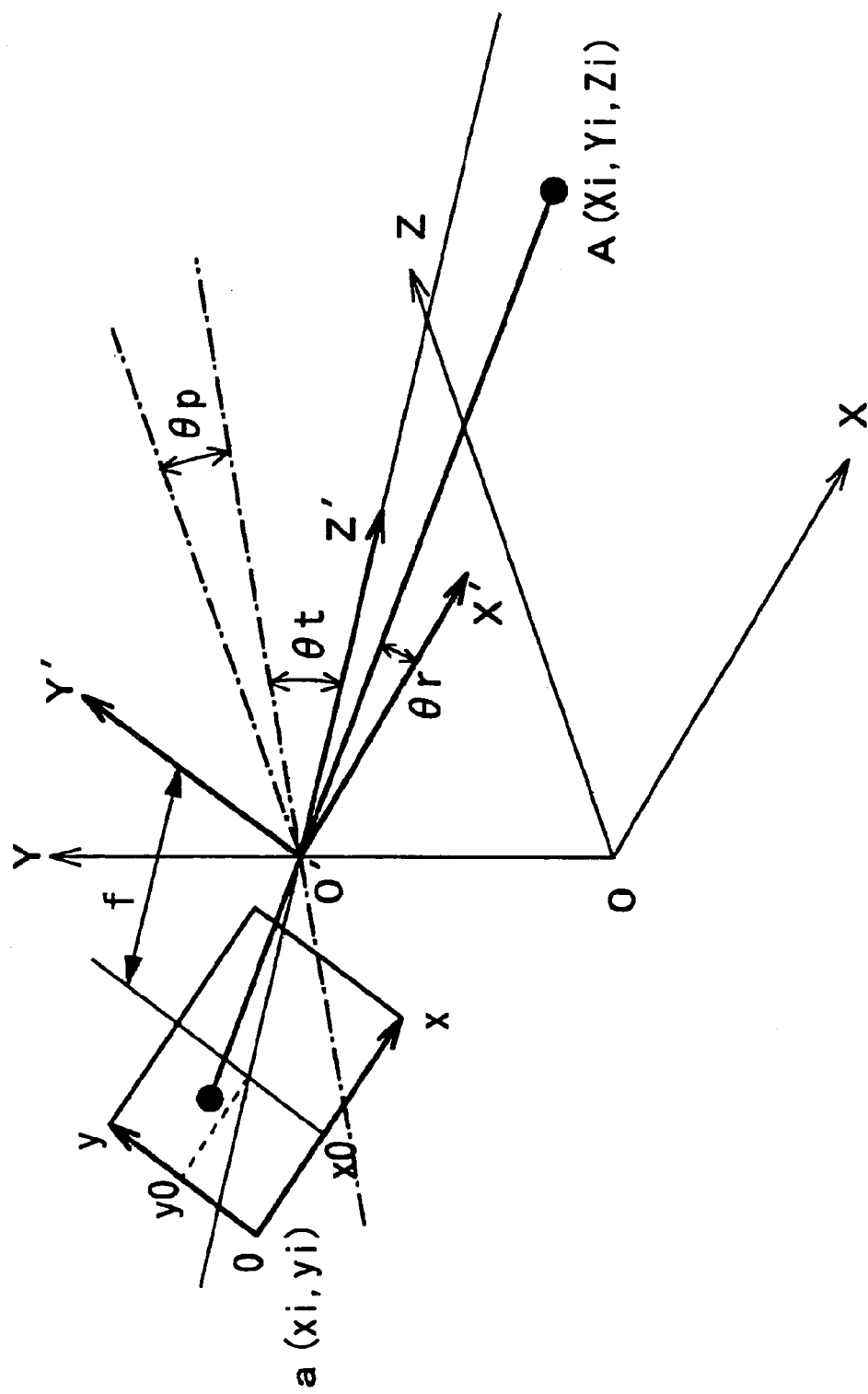
FIG. 6 is a diagram for explaining the transformation of coordinates used by the parking-assist device in the present embodiment.
Figure 7:
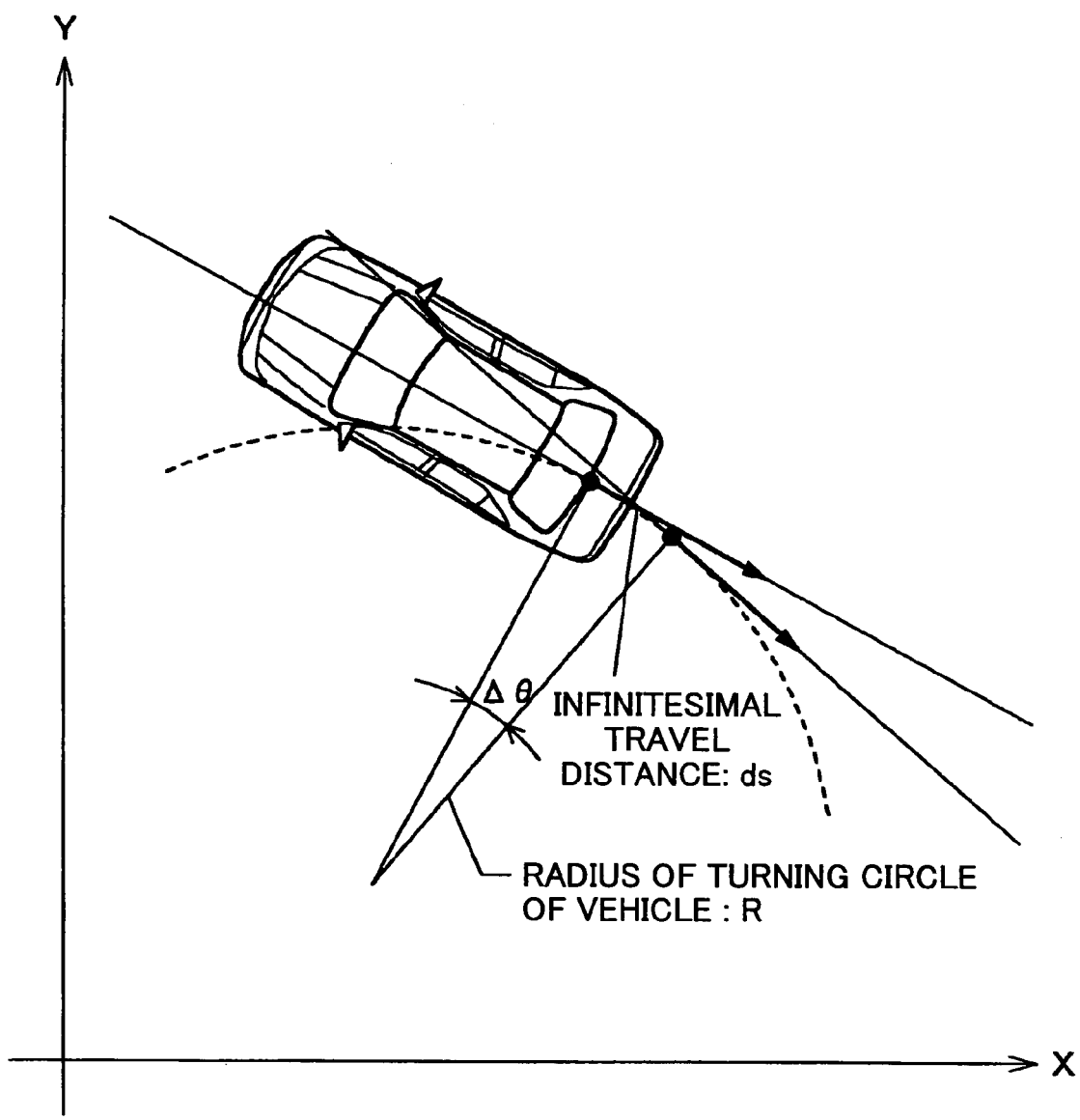
FIG. 7 is a diagram for explaining the definition of an infinitesimal travel distance used by the parking-assist device in the present embodiment at the time of setting the target parking position.

Moreover, FIG. 6 is a diagram for explaining the transformation of coordinates used by the parking-assist device in the present embodiment. FIG. 7 is a diagram for explaining the definition of an infinitesimal travel distance used by the parking-assist device in the present embodiment at the time of setting the target parking position.

Furthermore, FIG. 8A is a diagram showing the screen indication of the touch panel used by the parking-assist device in the present embodiment when the setting of the target parking position is performed at a time. FIG. 8B is a diagram showing the screen indication of the touch panel used by the parking-assist device in the present embodiment when the setting of the target parking position is performed at multiple times.

As shown in FIG. 1, the rear view camera 1 which includes the CCD camera is attached to the rear of the vehicle 100. The rear view camera constitutes the imaging unit 60 which creates an image of an exterior behind the vehicle 100 in the present embodiment.

The display 2 and the electronic control unit (ECU) 3 constitute the display unit 70 in the present embodiment. The display unit 70 displays the image created by the rear view camera 1 directly only through the known video signal processing without carrying out other signal processing. At the same time, the display unit 70 displays the image of specific target-parking-position information which is obtained through the signal processing with the electronic control unit (ECU) 3 (which will be described later) is superimposed on the created image on the display 2.

The steering angle sensor 4 is provided to detect the rotation angle of the steering wheel 4a. The wheel speed sensor 5 at the right rear wheel 5a and the wheel speed sensor 6 at the left rear wheel 6a are provided to detect the amount of vehicle travel, the present state of the vehicle 100, and the estimated subsequent travel position of the vehicle 100.

The steering angle sensor 4, the right-rear-wheel speed sensor 5, the left-rear-wheel speed sensor 6, and the electronic control unit 3 constitute the vehicle-travel-amount detection unit 40 which detects the amount of travel of the vehicle 100 in the present embodiment.

As shown in FIG. 4, the target-position confirmation key 83 is arranged at the right-hand side lower part of the touch panel 80. The touch panel 80 is arranged so that it is laid on top of the front surface of the display provided on the instrument pane. In the present embodiment, the touch panel 80 is integrally formed with the display 2 which is arranged in front of the driver on the vehicle 100. Alternatively, when carrying out the present invention, the display 2 and the touch panel 80 may be formed separately.

The touch panel 80 is depressed by the driver when setting up the target parking position to park the vehicle 100. The touch panel 80 constitutes the target-parking-position input unit 20 in the present embodiment. Alternatively, the touch panel 80 may be replaced by the stick, the key, or the push-button switch, when carrying out the present invention.

In addition, in the present embodiment, the target parking position means the relative position with respect to the current position of the vehicle 100.

The screen indication of the touch panel 80 is configured as shown in FIG. 8A when the target-parking-position setting of the parking-assist device is performed at a time, or it is configured as shown in FIG. 8B when the target-parking-position setting is performed at multiple times.

As shown in FIG. 8A, the area of the memory storage key 81 is located at the right-hand side upper part of the touch panel 80, and the memory reading key 82 is located directly under the memory storage key 81.

Moreover, the target-position confirmation key 83 is located at the right-hand side lower part of the touch panel 80, and the right-and-left switch key 84 is located at the left-hand side lower part thereof. The switch key 84 is provided to switch the display indication of the targetparking-position information 85 between the left-hand side upper part and the right-hand side upper part in a repetitive manner.

In addition, the target-parking-position information 85 is the image which is derived by transforming the image of the exterior behind the vehicle 100 created by the rear view camera 1.

Moreover, on the right-hand side of the touch panel 80, various direction keys are located where the image of the target-parking-position information 85 is not concealed. The direction keys of the touch panel 80 include the up direction key 91 provided to move the screen of the display in the upward direction, the rightward direction key 93 provided to move the display screen in the right direction, the down direction key 95 provided to move the display screen in the downward direction, and the leftward direction key 97 provided to move the display screen in the left direction.

Moreover, the direction keys include the up-right direction key 92 provided to move the display screen in the upper right direction, the down-right direction key 94 provided to move the display screen in the lower right direction, the down-left direction key 96 provided to mode the display screen in the lower left direction, and the up-left direction key 98 provided to move the display screen in the upper left direction.

Furthermore, the direction keys include the rotational direction keys 99R and 99L. The rotational direction key 99R is provided to rotate the image of the target-parking-position information 85 around the center ahead in the right rotational direction by one degree per second when continuous depression is applied or by 15 degrees when intermittent depression is applied. The rotational direction key 99L is provided to rotate the image of the target-parking-position information 85 around the center ahead in the left rotational direction by one degree per second when continuous depression is applied or by 15 degrees when intermittent depression is applied.

FIG. 8B shows another example of the display indication of the touch panel 80. For the sake of convenience, a description will be given of only the difference between the example of FIG. 8A and the example of FIG. 8B.

In the example of FIG. 8B, there are provided three memory selection keys 86, 87, and 88 (or the keys "1", "2", and "3") so that any desired one of the three items of the target-parking-position information 85 can be stored to the memory or read out from the memory with the depression of the selection key in addition to the memory storing key 81 or the memory reading key 82. Incidentally, in the example of FIG. 8A, only one memory storage region is provided.

When writing information to the memory, the writing of the target-parking-position information 85 currently displayed on the display 2 to the memory is performed by depressing the memory storage key 81 after depressing the selected one of the three memory selection keys "1", "2", and "3".

Moreover, when reading the information from the memory, the reading of the target-parking-position information 85 from the memory is performed by depressing the memory reading key 82 after depressing the selected one of the memory selection keys "1", "2", and "3". The depression of the selected one of the three memory selection keys "1", "2", and "3" causes the specific item of the target-parking-position information 85 stored in the corresponding storage region of the memory to be read out.

The memory storage key 81 and the memory reading key 82 described above with FIG. 8A are provided on the touch panel 80, and the specific regions of the non-volatile memory 10 contained in the electronic control unit 3 are allocated for these keys.

Moreover, the three memory selection keys 86, 87 and 88, the memory storage key 81 and the memory reading key 82 of FIG. 8B are provided on the touch panel 80, and the specific regions of the non-volatile memory 10 contained in the electronic control unit 3 are allocated for these keys. The depression of the selected one of the memory selection keys 86, 87 and 88 and the depression of the memory storage key 81 causes the target-parking-position information 85 to be stored into the specific area of the non-volatile memory 10 contained in the electronic control unit 3.

Moreover, the depression of the selected one of the memory selection keys 86, 87 and 88 and the depression of the memory reading key 82 causes the stored target-parking-position information 85 to be read from the specific region of the non-volatile memory 10 contained in the electronic control unit 3, and the read information is transferred to the buffer used for the computation.

The memory selection keys 86, 87 and 88, the memory storage key 81, and the memory reading key 82 have the plurality of storage regions of the target-parking-position information 85 of the non-volatile memory 10 contained in the electronic control unit 3. One of the plurality of storage regions is selected with the depression of any of these keys, the corresponding item of the target-parking-position information 85 is stored in the memory by the target-parking-position memory access unit 30 in the present embodiment. The target-parking-position memory access unit 30 in the present embodiment is provided to read, alternatively, the stored target-parking-position information 85 from the memory if requested.

In addition, the shift-lever position detection unit 9 includes the reverse position sensor 11. The reverse position sensor 11 is the known sensor which detects the position of the shift lever. This sensor may be provided to detect whether the shift lever is located at the reverse position or detect whether the transmission is set to the reverse position.

As shown in FIG. 2, the electronic control unit (ECU) 3 comprises the target-parking-position input unit 20, the target-parking-position memory access unit 30, the vehicle-travel-amount detection unit 40, and the parking route determining unit 50. Moreover, the ECU 3 and the display unit 70 in combination provide the functions to display the image created by the rear view camera and to display one of the target parking position inputted by the target-parking-position input unit 20 and the stored target parking position read by the target-parking-position memory access unit 30 on the created image in a superimposed manner.

The target-parking-position input unit 20 provides the functions to input the target-parking-position information 85 to park the vehicle in response to the driver's request and to set the inputted information to the parking route determining unit 50. The target-parking-position memory access unit 30 provides the functions to store the target parking position information 85 into the memory in response to the driver's request, to read the stored target parking position information 85 from the memory in response to the driver's request and to set the read information to the parking route determining unit 50.

The vehicle-travel-amount detection unit 40 provides the function to detect the amount of travel of the vehicle 100 in association with the steering angle sensor 4, the right-rear-wheel speed sensor 5, and the left-rear-wheel speed sensor 6.

The parking route determining unit 50 provides the function to calculate the parking route from the current position of the vehicle 100 detected by the vehicle-travel-amount detection unit 40 to the target parking position. Hence, the display unit 70 displays the image created by the rear view camera 1, and displays one of the target parking position inputted by the target-parking-position input unit 20 and the stored target parking position read by the target-parking-position memory access unit 30 on the created image on the display in a superimposed manner.

Next, a description will be given of the parking-assist control procedure executed by the ECU 3 of the parking-assist device in the present embodiment with reference to FIG. 3A and FIG. 3B.

In the flowchart of FIG. 3A and FIG. 3B, at the start of the parking-assist control procedure, using the reverse position sensor 11, the ECU 3 detect whether the shift lever is at the reverse position at step S1. When it is detected that the shift lever is not at the reverse position, the parking-assist control procedure is terminated, and the control is transferred to another processing.

When it is detected at step S1 that the shift lever is at the reverse position, the ECU 3 drives the rear view camera and the display at step S2, so that the image of the exterior behind the vehicle 100 is created by the camera and displayed on the display 2.

At step S3, the ECU 3 calculates the target-parking-position information 85. The initially computed target parking position is considered as the target parking position with a high probability.

This target parking position can be uniquely set as the left corner or right corner of the image of the display 2. Alternatively, by learning the previous driver's knowledge of garage parking, the target-parking-position information 85 may be determined.

At step S4, the ECU 3 computes the screen position of the target parking position indication on the display and displays the target parking position indication at the computed position on the display 2 over the created image in a superimposed manner.

The computed position of the target parking position indication is expressed with 2-dimensional coordinates on the plane coordinates (X-axis, Y-axis). It is assumed that the rear view camera 1 is arranged at the predetermined height position (Z-axis) of the vehicle 100. The image of the target parking position on the display 2 is taken as the same image expression as the image created by the rear view camera 1.

As shown in FIG. 5, based on the size of the vehicle 100, the size of the parking lot where the vehicle 100 is parked is expressed with the 2-dimensional coordinates. Namely, the length of the parking lot is set to the length A1–A4 and the length A2–A3, and the width of the parking lot is set to the width A1–A2 and the width A4–A3.

Then, the target parking position K0 is set to X0, Y0, and θ 0 with the 2-dimensional coordinates. The first specific position K1 where the vehicle 100 is initially located is set to X1, Y1, and θ 1 with the 2-dimensional coordinates such that the position of the vehicle 100 finally reaches the target parking position (X0, Y0, θ0). The second specific position K2 to which the vehicle is moved back is set to X2, Y2, and θ 2 with the 2-dimensional coordinates.

In the meantime, the parking route is calculated repeatedly during this period. The image created by the rear view camera 1 is expressed on the 2-dimensional screen as an image (x-axis, y-axis) on the display as in the known representation technique.

Although the image is expressed on the display 2 as the 2-dimensional screen, the position is actually determined by the world coordinates (X-axis, Y-axis, Z-axis) including the three dimensions which indicate the positional information of the parking lot.

For example, the point A (Xi, Yi, Zi) on the surface of the earth of FIG. 6 is transformed into the point a on the image coordinates (xi, yi) as a drawing point of the world coordinates in accordance with the following formulas.

$$a = P \begin{bmatrix} A \\ 1 \end{bmatrix} \quad (1)$$

$$P = C \begin{bmatrix} R \\ T \end{bmatrix} \quad (2)$$

In the above formulas (1) and (2), "P" is the projection transformation matrix of 3×4 size corresponding to the display 2, "C" is the internal parameter of the rear view camera 1, "R" indicates the rotation movement, and. "T" indicates the parallel displacement.

It is assumed that the optical axis (centerline) of the rear view camera 1 is located at the center (x0, y0) on the image coordinates of the display 2. Then, if it is assumed that the world coordinates are placed in accordance with Z'axis orientation of the system of coordinates (X'axis, Y'axis, Z'axis) in the three-dimensional space, the Z'axis orientation can be disregarded.

Thus, after the parking target position indication is calculated by the world coordinates and the calculated indication is transformed into the point on the image coordinates system in accordance with the above formulas (1) and (2), the image of the transformed indication is superimposed as a graphic drawing over the image created by the rear view camera 1.

Namely, at step S4, the image of the target-parking-position information 85 is superimposed on the image created the rear view camera 1 based on the calculation result of step S3, and the superimposed image is displayed as an image on the display 2.

At step S5, the ECU 3 determines the current position information of the vehicle 100 as a plane position from the created image of the rear view camera 1, and calculates the actual parking route for the target-parking-position information 85.

At step S6, the ECU 3 determines whether the adjustment of the target-parking-position information 85 inputted at step S3 is requested with any of the various direction keys of the touch panel 80 including the up-direction key 91, the up-right direction key 92, the rightward direction key 93, the down-right direction key 94, the down direction key 95, the down-left direction key 96, the leftward direction key 97, the up-left direction key 98, the rotational direction key 99R, and the rotational direction key 99L.

If any of the direction keys of the touch panel 80 is depressed, it is determined that the adjustment is requested, and the control is transferred to step S7. At step S7, the ECU 3 calculates the adjusted target-parking-position information 85 again according to the adjustment input of the target-parking-position information 85. The control is returned to step S4, so that the image of the corrected target-parking-position information 85 is superimposed on the image created by the rear view camera 1, and such superimposed indication is expressed as an image of the display 2.

Namely, if the result at step S6 is affirmative, it is determined that the adjustment request is made, the routine of step S6, step S7 and step S4 is repeated.

When the result at step S6 is negative, the control is transferred to step S8. At step S8, the ECU 3 determines whether the memory storage key 81 is depressed.

Namely, in the example of FIG. 8A, if the depression of the memory storage key 81 is detected, the ECU 3 at step S9 stores the target-parking-position information 85 currently displayed into the specific region of the non-volatile memory 10 contained in the ECU 3, and the routine of step S9, step S4 through step S8 will be repeated.

Moreover, in the example of FIG. 8B, the ECU 3 at step S9 stores the target-parking-position information 85 into the specific region of the non-volatile memory 10 contained in the ECU 3, in response to the selective depression of the memory selection keys "1", "2" and "3" in addition to the depression of the memory storage key 81.

When it is determined at step S8 that the memory storage key 81 is not depressed, the control is transferred to step S10.

At step S10, the ECU 3 determines whether the reading of the target-parking-position information 85 stored in the non-volatile memory 10 contained in the ECU 3 is requested by depression of the memory reading key 82.

In the example of FIG. 8A, if the depression of the memory reading key 82 is detected, the ECU 3 at step S11 reads the target-parking-position information 85 stored in the non-volatile memory 10 contained in the ECU 3. Moreover, at step S11 the ECU 3 sets the read target-parking-position information 85 to the parking route determining unit 50 so that the parking route from the current position of vehicle 100 detected by the vehicle-travel-amount detection unit 40 to the target parking position is calculated. The routine of step S11, step S4 through step S10 is repeated.

Moreover, in the example of FIG. 8B, if the selective depression of the memory selection keys "1", "2" and "3" and the depression of the memory reading key 82 are detected, the ECU 3 at step S11 reads from the memory one of the items of the target-parking-position information 85 corresponding to the memory selection keys "1", "2" and "3" stored in the non-volatile memory 10 contained in the ECU 3. Moreover, at step S11 the ECU 3 sets the read item of the target-parking-position information 85 to the parking route determining unit 50 so that the parking route from the current position of vehicle 100 detected by the vehicle-travel-amount detection unit 40 to the target parking position. The routine of step S11, step S4 through step S10 is repeated.

When it is determined at step S10 that the memory reading key 82 is not depressed, the control is transferred to step S12. At step S12, the ECU 3 determines whether the target-parking-position confirmation key 83 of the touch panel 80 is depressed.

When the result at step S12 is affirmative, it is determined that the target parking position is finally confirmed, and the control is transferred to step S13 of FIG. 3B. At step S13, the ECU 3 outputs the voice guidance of the parking assist start.

On the other hand, when the result at step S12 is negative, the routine of step S6 through step S12 is repeated. Namely, the determination at each of step S6, step S8, step S10 and step S12 is performed respectively until the depression of the target-parking-position confirmation key 83 is detected at step S12.

At step S14, the ECU 3 calculates the amount of travel of the vehicle 100 by obtaining the detection results of the steering angle sensor 4, the right-rear-wheel speed sensor 5, and the left-rear-wheel speed sensor 6.

The calculation of the amount of travel of the vehicle 100 is superficially defined, as shown in FIG. 7, and the amount of travel of the vehicle is calculated in accordance with the following formulas.

$$X = \int_0^\alpha \sin\theta \cdot ds \tag{3}$$

$$Z = \int_0^\alpha \cos\theta \cdot ds \tag{4}$$

$$\theta = \int_0^\alpha \frac{1}{R} \cdot ds \tag{5}$$

In the above formulas (3) to (5), "ds" is the infinitesimal travel distance and calculated based on the amount of rotation of the tires detected from the right-rear-wheel speed sensor 5 and the left-rear-wheel speed sensor 6, "R" is the radius of the turning circle of the vehicle and calculated based on the value of the steering angle sensor 4, and "α" (alpha) is the accumulated amount of travel of the vehicle 100 from the parking starting position.

Next, at step S15, the ECU 3 calculates the amount of target steering relative to the parking route.

At step S16, the ECU 3 controls the steering actuator by outputting the steering-actuator control signal based on the calculated amount of target steering. At step S17, the ECU 3 determines whether the target parking position is reached.

The routine of step S14 through step S17 is repeated until the result at step S17 is affirmative (or until the target parking position is reached).

In the parking-assist device of the above-described embodiment, the imaging unit 60 uses the rear view camera 1 to provide the function to create an image of an external rear view of the vehicle 100.

The target-parking-position input unit 20 provides the functions to input the target-parking-position information 85 to park the vehicle 100 in response to the driver's request and to set the inputted information to the parking route determining unit 50 by executing the processing of steps S6 and S7.

The target-parking-position memory access unit 30 provides the functions to store the target parking position information 85 into the memory in response to the driver's request, to read the stored target parking position information 85 from the memory in response to the driver's request and to set the read information to the parking route determining unit 50 by executing the processing of steps S8 to S11.

The vehicle-travel-amount detection unit 40 provides the function to detect the amount of travel of the vehicle in association with the steering angle sensor 4, the right-rear-wheel speed sensor 5, and the left-rear-wheel speed sensor 6 by executing the processing of step S14.

The parking route determining unit 50 provides the function to calculate the parking route from the current position of the vehicle 100 detected by the vehicle-travel-amount detection unit 40 to the target parking position by executing the processing of step S5.

The display unit 70 provides the functions to display the image created by the rear view camera 1, and to display one of the target parking position inputted by the target-parking-position input unit 20 and the stored target parking position read by the target-parking-position memory access unit 30 on the created image on the display 2 in a superimposed manner by executing the processing of steps S2 through S12. Thus, the driver on the vehicle 100 is guided to the target parking position according to the parking route.

Accordingly, if the target-parking-position information 85 inputted by the target-parking-position input unit 20 is set to the parking route determining unit 50, the parking route determining unit 50 calculates the parking route from the current position of the vehicle 100 detected by the vehicle-travel-amount detection unit 40 to the target-parking-position information 85.

While displaying the image created by the imaging unit 60, which creates an image of an external rear view of the vehicle 100, the display unit 70 displays the image of the target-parking-position information 85 inputted by the target-parking-position input unit 20 on the created image in a superimposed manner, and the driver on the vehicle 100 is guided according to the parking route from the vehicle position to the target-parking-position information 85. Moreover, automatic operation can be performed if requested.

In addition, when parking the vehicle in the garage of the house or the parking lot of the office, the target-parking-position information 85 is repeatedly set up using the same parking starting position. Under such parking conditions, the target-parking-position information 85 is beforehand stored in the memory by the target-parking-position memory access unit 30. If needed, the stored target-parking-position information 85 concerned is read from the memory, and the target-parking-position information 85 stored by the target-parking-position memory access unit 30 is set to the parking route determining unit 50.

Hence, the parking route from the current position of the vehicle 100 detected by the vehicle-travel-amount detection unit 40 to the target-parking-position information 85 is calculated by the parking route determining unit 50. The display unit 70 displays the image created by the imaging unit 60, which creates an image of an external rear view of the vehicle 100, on the display 2. At the same time, the display unit 70 displays the image of the target-parking-position information 85 stored by the target-parking-position memory access unit 30 on the created image in a superimposed manner, and the garage parking is guided according to the parking route from the vehicle position to the target-parking-position information 85. Moreover, automatic operation can be performed if requested.

When the operator operates the vehicle 10 to park the vehicle 100, so that a car may be parked, the superimposed indication of the target-parking-position information 85 which indicates the target parking position, together with the created image of the rear view camera 1, is given in the screen of the display 2 of the interior occupant compartment of the vehicle 100.

The configuration and size of the target-parking-position indication 85 are calculated as being almost identical to the configuration and size of the vehicle 100 in the world coordinates reflected in the image of the rear view camera 1.

In order to obtain the superimposed indication, projection transformation from the system of world coordinates to the system of image coordinates is performed, so that the screen position of the target-parking-position information on the display 2 is calculated.

In order to adjust the position of the target-parking-position information 85, the driver is allowed to adjust arbitrarily the target parking position indication with the various direction keys and the rotational direction keys on the screen of the touch panel 80 so as to match with the actual parking region which indicated by the created image of the rear view camera 1 based on the initialized or read parking target position information 85.

Therefore, under the parking conditions using the same target-parking-position information and the same parking starting position as in the garage of the house and the parking lot of the office, the previously recorded target-parking-position information 85 can be read from the memory. Thus, the number of times of operation of the parking-assist device can be reduced, and the ease of operation can be improved.

Especially, in the above-described embodiment, the target-parking-position memory access unit 30 is provided to have the plurality of storage regions to store the target-parking-position information 85. The target-parking-position memory access unit 30 can store the target-parking-position information 85 selectively in one of the plurality of storage regions when requested, and alternatively can read the stored target-parking-position information 85 from the storage region concerned when requested.

Under the parking conditions using the same parking starting position and the same target-parking-position information 85 as in the garage of the house and the parking lot of the office, or when parking the vehicle 100 in the supermarket, the plurality of items of the target-parking-position information 85 are stored beforehand in the memory, and the selected item of the target-parking-position information 85 can be read from the memory when requested. Therefore, the number of times of operation of the parking-assist device can be reduced, and the ease of operation can be improved.

In the above-described embodiment, the target-parking-position information 85 stored in the non-volatile memory 10 can be set to the value with high probability within a predetermined range in the probability distribution by establishing the learning.

Figure 9A:
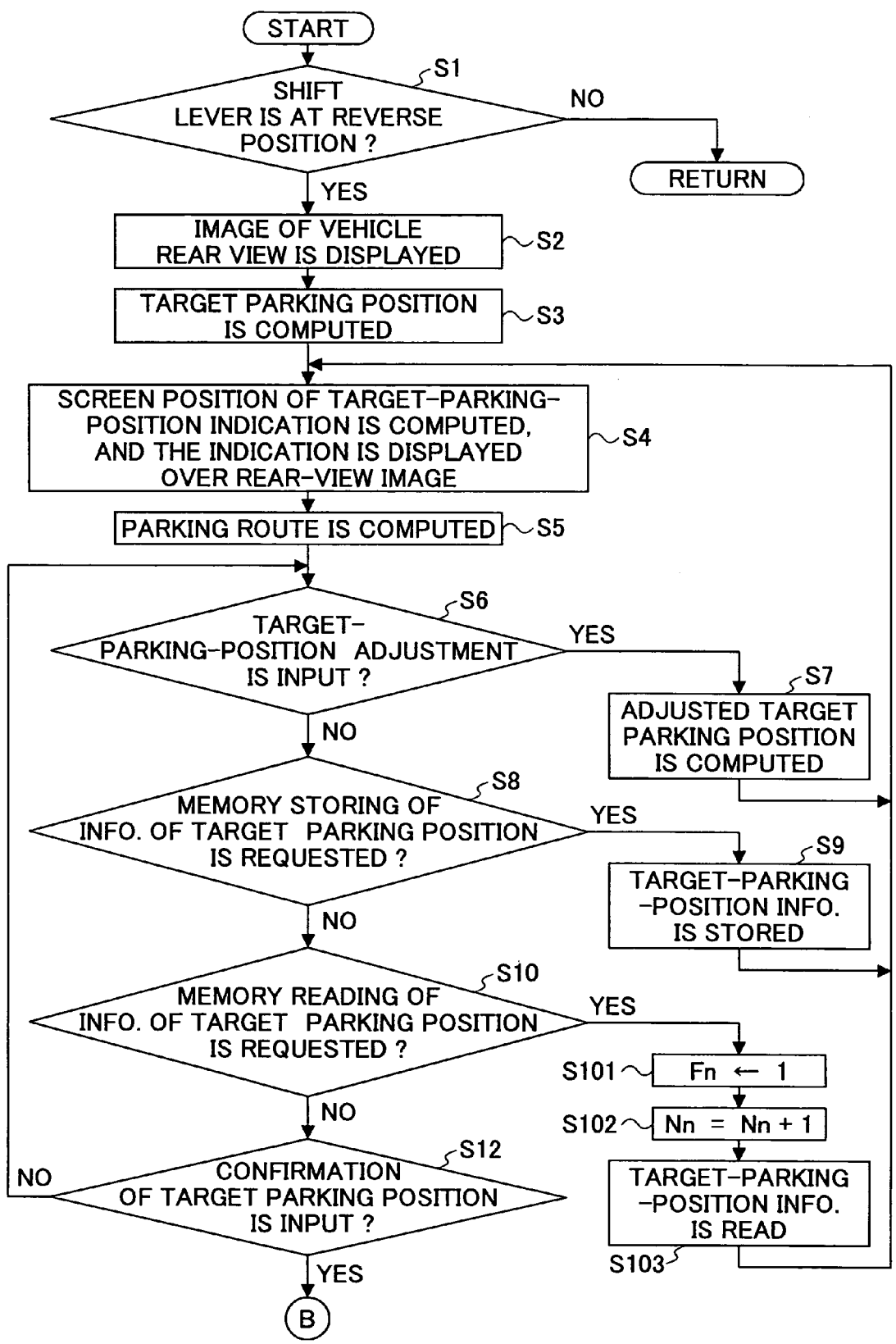
FIG. 9A and FIG. 9B are a flowchart for explaining the parking assist control procedure executed by the electronic control unit in another preferred embodiment of the invention.
Figure 9B:
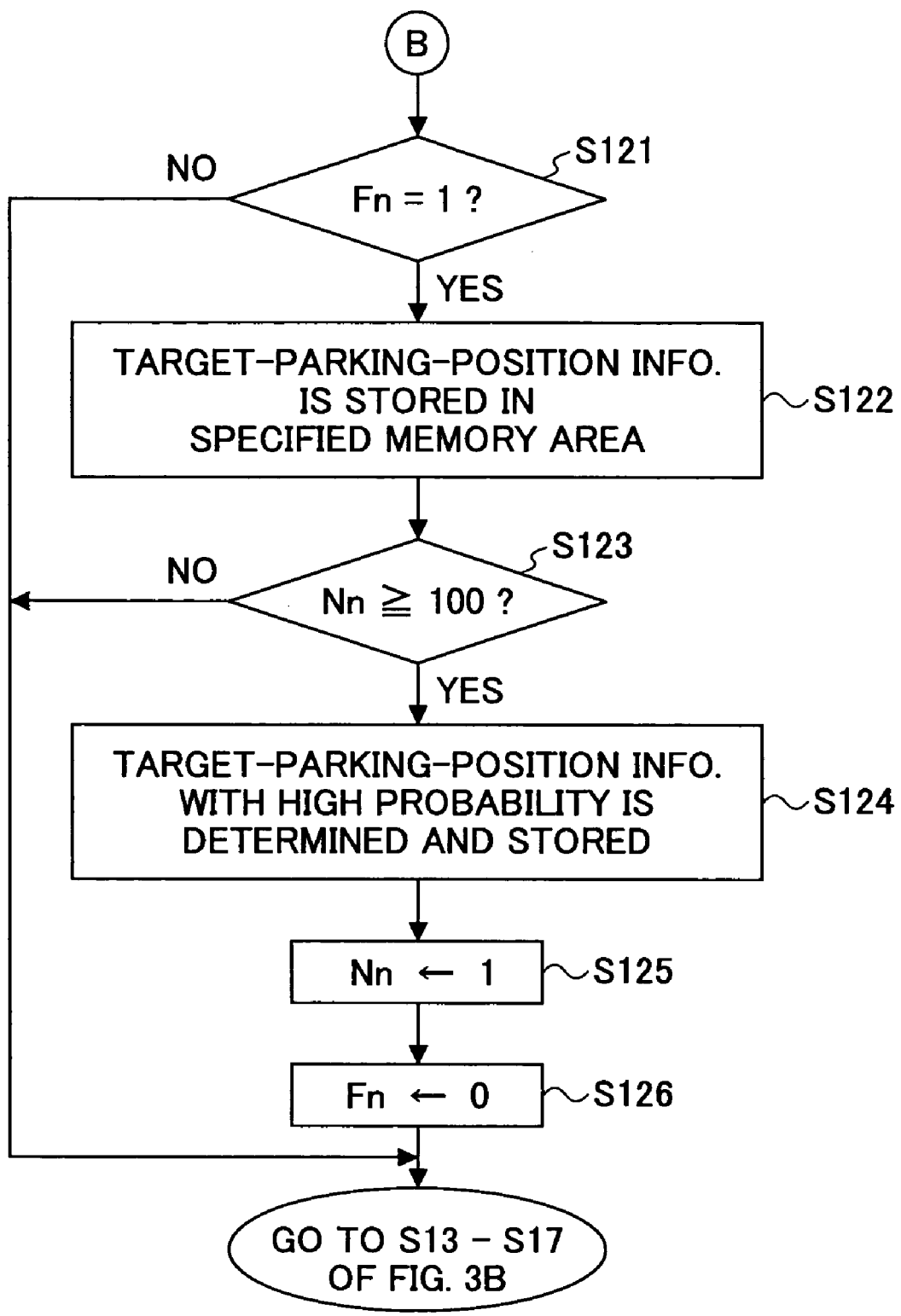

Next, FIG. 9A and FIG. 9B are a flowchart for explaining the parking-assist control procedure executed by the ECU of the parking-assist device in another preferred embodiment of the invention.

In the embodiment of FIG. 9A and FIG. 9B, the steps which are essentially the same as the corresponding steps in FIG. 3A and FIG. 3B are designated by the same reference numerals, and a description thereof will be omitted for the sake of convenience. Hence, only the differences between the embodiment of FIG. 9A and FIG. 9B and the embodiment of FIG. 3A and FIG. 3B will be explained.

In the flowchart of the present embodiment, the routine of steps S10 to S12 of FIG. 3A is replaced with the routine of steps S10, S101 to S103 and S12 of FIG. 9A and the routine of steps S121 to S126 of FIG. 9B.

Similar to the flowchart of FIG. 3A, in the embodiment of FIG. 9A, the ECU 3 at step S10 determines whether the reading of the target-parking-position information 85 stored in the non-volatile memory 10 contained in the ECU 3 is requested by depression of the memory reading key 82 of the touch panel 80.

When it is determined at step S10 that the memory reading key 82 is not depressed, the control is transferred to step S12. At step S12, the ECU 3 determines whether the target-parking-position confirmation key 83 is depressed.

When the result at step S12 is affirmative, it is determined that the target parking position is finally confirmed, and the control is transferred to step S121 of FIG. 9B, which will be described later.

When the result at step S12 is negative, the routine of step S6 through step S12 is repeated until the depression of the target-parking-position confirmation key 83 is detected step S12.

On the other hand, when it is determined at step S10 that the memory reading key 82 is depressed, it is determined that the reading of the target-parking-position information 85 stored in the non-volatile memory 10 contained in the ECU 3 is requested, and the control is transferred to step S101. At step S101, the ECU 3 sets the flag "Fn" at the value "1" (Fn <−1).

That is, the value one of the flag "Fn" indicates that the reading of the stored target-parking-position information 85 of the non-volatile memory 10 is requested by the depression of the memory reading key 82.

At step S102, the ECU 3 increments the counter "Nn" by 1 (Nn=Nn+1). At step S103, the ECU 3 reads the stored target-parking-position information 85 from the non-volatile memory 10.

In the example of FIG. 8A, the value "n" of the flag Fn is meaningless. However, in the example of FIG. 8B, the value "n" of the flag Fn is used to identify a specific one of "the flag N1", "the flag N2" and "the flag N3" to which the memory selection keys "1", "2" and "3" correspond respectively.

Moreover, in the examples of FIG. 8A and FIG. 8B, the value "n" of the counter Nn indicates the number of times of checking (which is set to "1, 2, . . . , 99, 100") and is used to specify the address of the non-volatile memory 10.

After step S103 is performed, the request for adjustment of the target-parking-position information 85 is detected at steps S6 and S7 with any of the direction keys of the touch panel 80 including the up-direction key 91, the up-right direction key 92, the rightward direction key 93, the down-right direction key 94, the down direction key 95, the down-left direction key 96, the leftward direction key 97, the up-left direction key 98, the rotational direction key 99R, and the rotational direction key 99L.

If the request for the adjustment is detected, the adjusted target-parking-position information 85 is calculated again according to the adjustment input of the target-parking-position information 85 on the touch panel 80. The control is returned to step S4, and the image of the corrected target-parking-position information 85 is superimposed on the image created by the rear view camera 1, and such superimposed indication is expressed as an image of the display 2.

The determinations of step S8, step S10 and step S12 are repeatedly performed until the depression of the target-position confirmation key 83 is detected at step S12. When the depression of the target-position confirmation key 83 is detected at step S12, the control is transferred to step S121 of FIG. 9B.

At step S121, the ECU 3 determines whether the value of the flag Fn is equal to 1. When the result at step S121 is negative (or when the flag Fn is set to 0), the control is transferred to step S13 of FIG. 3B, so that the ECU 3 outputs the voice guidance of the parking assist start, similar to the previous embodiment.

When the result at step S121 is affirmative (or when the flag Fn is set to 1), the control is transferred to step S122. At step S122, the ECU 3 stores the target-parking-position information 85 in the specified storage region of the non-volatile memory 10. That is, one of the plurality of storage regions of the non-volatile memory 10 is specified by the value "n" (=1, 2, . . . , 99, or 100) of the counter Nn at that time, and the target-parking-position information 85 is stored into the specified storage region of the non-volatile memory 10 at step S122.

At step S123, the ECU 3 determines whether the value "n" of the counter Nn is larger than "100". When the result at step S123 is affirmative, the ECU 3 at step S124 determines the target-parking-position information 85 with high probability by referring to all the items of the target-parking-position information 85 stored in the storage regions of the non-volatile memory 10. The ECU 3 at step S124 stores the target-parking-position information 85 with high probability in the non-volatile memory 10 as follows.

Namely, in the example of FIG. 8A, the target-parking-position information 85 with high probability is stored in the storage region of the non-volatile memory 10 indicated by the value "n" of the counter Nn. In the example of FIG. 8B, the target-parking-position information 85 with high probability is stored in the storage region of the non-volatile memory 10 the address of which is indicated by the selected one of the memory selection keys "1", "2" and "3".

At step S125, the ECU 3 resets the value "n" of the counter Nn to specify the address of the non-volatile memory 10 to the initial value. At step S126, the ECU 3 resets the value of the flag Fn to zero. After step S126 is performed, the control is transferred to step S13 of FIG. 3B, similar to the previous embodiment.

Accordingly, the parking-assist device of the present embodiment provides the driver with the learning function, and the image of the target-parking-position information 85 which is suited to the features of operation of the driver can be set up on the display 2.

In the parking-assist device of the above-described embodiments, the amount of target steering relative to the parking route is computed at step S15, the steering-actuator control signal is outputted at step S16, and it is determined at step S17 whether the target parking position is reached. Automatic vehicle operation is provided by the parking-assist device. Alternatively, when carrying out the present invention, either the image-only guidance or the voice-image combined guidance may be performed in combination with the automatic operation control.

Although the above-described embodiments relate to a parking-assist device which assists the driver on the vehicle in performing garage parking, column parking, etc., the concept of the present invention is also applicable to a reversing-assist device which assists the driver on the vehicle in performing the reversing operation to make the course change at a three-pronged road etc. with a narrow road width or in performing the straight-line reversing operation.

Next, a description will be given of the reversing-assist device of the present invention.

The composition of the automotive vehicle that is essentially the same as the composition of the parking-assist device of the above-described embodiments can be used for the automotive vehicle in which the reversing-assist device of the invention is embodied. For this reason, the elements of the reversing-assist device which are essentially the same as corresponding elements of the above-described parking-assist device are designated by the same reference numerals in the following.

The functional composition of the electronic control unit (ECU) 3 in the vehicle in which a preferred embodiment of the reversing-assist device of the invention is incorporated will now be explained.

In the reversing-assist device of the present embodiment, the rear view camera 1 including the CCD camera is attached to the rear of the vehicle 100, and this rear view camera 1 constitutes an imaging unit 60 which creates an image of an exterior behind the vehicle 100.

Similar to the embodiment of FIG. 2, the electronic control unit (ECU) 3 in the present embodiment comprises the target-reversing-position input unit 20, the target-reversing-position memory access unit 30, the vehicle-travel-amount detection unit 40, and the reversing route determining unit 50. Moreover, the ECU 3 and the display unit 70 in combination provide the functions to display the image created by the rear view camera 1 and to display one of the target reversing position inputted by the target-reversing-position input unit 20 and the stored target reversing position read by the target-reversing-position memory access unit 30 on the created image in a superimposed manner.

The target-reversing-position input unit 20 (equivalent to the target-parking-position input unit 20) provides the functions to input the target reversing position information 85 (equivalent to the target-parking-position information 85) to reverse the vehicle 100 when requested and set up the inputted information to the reversing route determining unit 50.

The target-reversing-position memory access unit 30 (equivalent to the target-parking-position memory access unit 30) provides the functions to store the target reversing position information 85 into the memory, read the stored target reversing position information 85 from the memory, and set up the read information to the reversing route determining unit 50.

The vehicle-travel-amount detection unit 40 provides the function to detect the amount of travel (reversing) of the vehicle 100 in association with the steering angle sensor 4, the right-rear-wheel speed sensor 5, and the left-rear-wheel speed sensor 6.

The reversing route determining unit 50 (equivalent to the parking route determining unit 50) provides the function to calculate the reversing route from the current position of the vehicle 100 detected by the vehicle-travel-amount detection unit 40 to the reversing target position.

The display unit 70 displays the image created by the imaging unit 60, and displays one of the target reversing position inputted by the target-reversing-position input unit 20 (equivalent to the target-parking-position input unit 20) and the stored target reversing position read by the target-reversing-position memory access unit 30 (equivalent to the target-parking-position memory access unit 30) on the created image on the display 2 in a superimposed manner. Therefore, the driver on the vehicle is guided to the target reversing position according to the reversing route.

In the reversing-assist device of the present embodiment, the imaging unit 60 may have the capability of creating an image of an external rear view of the vehicle 100 similar to the parking-assist device. The wide angle lens or the standard lens may be used for the imaging unit 60. Preferably, the CCD camera with the standard lens etc. is used. In addition, the compensation is needed when the wide angle lens is used.

The target-reversing-position input unit 20 (equivalent to the target-parking-position input unit 20) is provided so that the indication of an initialized reversing position is automatically displayed at a specified position on the display 2, similar to the parking-assist device. The target-reversing-position input unit 20 may have the capability of freely moving the target reversing position with the stick operation, the key stroke, or the touch operation on the screen.

Similar to the parking-assist device, the target-reversing-position memory access unit 30 (equivalent to the target-parking-position memory access unit 30) is provided so that the desired reversing target position inputted by the target-reversing-position input unit 20 (equivalent to the target-parking-position input unit 20) and displayed at the given position of the display 2 can be freely stored in the memory by the stick operation, the key stroke, or the touch operation on the screen.

Moreover, the target-reversing-position memory access unit 30 is provided so that the stored reversing target position can be read from the memory by the stick operation, the key stroke, or the touch operation on the screen. Of course, the target-reversing-position memory access unit 30 may have the capability of recording the target reversing position in the memory at multiple times (updating registration).

Since the vehicle-travel-amount detection unit 40 is used for judging whether reversing movement of vehicle 100 is detected, the reversing route from the current position to the reversing target position is determined like the parking-assist device, and the vehicle under reversing are in the proper position, although what can detect the exact handle position of vehicle 100 and the position of the wheel is suitable for it, fundamentally, it should just be the vehicle speed sensor arranged in both wheels at least.

Similar to the parking-assist device, the reversing route determining unit 50 (equivalent to the parking route determining unit 50) will not be exceptionally limited, if it is the arithmetic circuit which can calculate the path from the current position of vehicle to the reversing target position, although the reversing route from the current position of the vehicle 100 detected by the vehicle-travel-amount detection unit 40 to the reversing target position is calculated and the microcomputer usually performs.

Similar to the parking-assist device, the liquid crystal display, the EL display, etc. may be used as the display unit 70. The function which specifically displays the image created by the usual imaging unit 60, it is based on the reversing target-position information set as the created image by the target-reversing-position input unit (equivalent to the target-parking-position input unit 20), or the reversing target-position storage unit (equivalent to the target-parking-position memory access unit 30).

What is necessary is just to have the function which indicates the reversing route from the vehicle position calculated with the reversing route determining unit (equivalent to the parking route determining unit 50) to the reversing target position by the superposition.

Namely, what is necessary is to draw the reversing target-position information set up by the target-reversing-position input unit (equivalent to the target-parking-position input unit 20), or the reversing target-position storage unit (equivalent to the target-parking-position memory access unit 30) on the transparent background in respect of the line, and just to pile up the line or the field view with the image created by the imaging unit 60.

Therefore, what is necessary is just the liquid crystal display, the EL display, etc. which have the mixer function. Hence, when changing the course at a three-pronged road or an intersection without the signal with narrow road width, if there is good vision, the reversing target position to reverse the vehicle 100 is inputted by the target-reversing-position input unit (equivalent to the target-parking-position input unit 20) directly on the spot and set to the reversing route determining unit (equivalent to the parking route determining unit 50).

The reversing route determining unit (equivalent to the parking route determining unit 50) calculates the reversing route from the current position of the vehicle 100 detected by the vehicle-travel-amount detection unit 40 to the reversing target position.

While displaying the image created by the imaging unit 60 which creates an image of an external rear view of the vehicle 100, the display unit 70 displays the image of the reversing target position inputted by the target-reversing-position input unit (equivalent to the target-parking-position input unit 20) on the created image in a superimposed manner, so that the driver on the vehicle 100 is guided according to the reversing route from the position of the vehicle 100 to the reversing target position. Moreover, automatic operation can be carried out if requested.

The present invention is not limited to the above-described embodiments, and variations and modifications may be made without departing from the scope of the present invention.

What is claimed is:

1. A parking-assist device for an automotive vehicle, comprising:
    an imaging unit which creates an image of an exterior behind the vehicle;
    a target-parking-position input unit which inputs a target parking position to park the vehicle when requested;
    a target-parking-position memory access unit which stores a plurality of items of target-parking-position information in a memory beforehand and reads a selected item of the target-parking-position information from the memory when requested;
    a parking-route determining unit which calculates a parking route from a current position of the vehicle to the target parking position; and
    a display unit which displays the image created by the imaging unit and displays one of the target parking position inputted by the target-parking-position input unit and the selected item of the target-parking-position information read by the target-parking-position memory access unit on the created image in a superimposed manner, so that an operator of the vehicle is guided to the target parking position according to the parking route, wherein the parking-route determining unit is configured to calculate the parking route from the current position of the vehicle to the selected item of the target-parking-position information.

2. The parking-assist device according to claim 1 wherein the target-parking-position memory access unit is provided to have a plurality of storage regions to store target-parking-position information, and the target-parking-position memory access unit stores the target parking position selectively in one of the plurality of storage regions if requested, and reads the target parking position from the storage region concerned.

3. The parking-assist device according to claim 1 wherein the display unit includes a touch panel, and a plurality of direction keys for adjusting a position of an image of the target parking position displayed on a screen of the touch panel are provided at locations in the touch panel where the image of the target parking position displayed on the touch panel screen is not concealed.

4. The parking-assist device according to claim 1 wherein the guiding of the operator of the vehicle to the target parking position is started when depression of a target-parking-position confirmation key of a touch panel is detected.

5. A reversing-assist device for an automotive vehicle, comprising:
    an imaging unit which creates an image of an exterior behind the vehicle;
    a target-reversing-position input unit which inputs a target reversing position to reverse the vehicle when requested;
    a target-reversing-position memory access unit which stores a plurality of items of target-reversing-position information in a memory beforehand and reads a selected item of the target-reversing-position information from the memory when requested;
    a reversing-route determining unit which calculates a reversing route from a current position of the vehicle to the target reversing position; and
    a display unit which displays the image created by the imaging unit and displays one of the target reversing position inputted by the target-reversing-position input unit and the selected item of the target-reversing-position information read by the target-reversing-position memory access unit on the created image in a superimposed manner, so that an operator of the vehicle is guided to the target reversing position according to the reversing route, wherein the reversing-route determining unit is configured to calculate the reversing route from the current position of the vehicle to the selected item of the target-reversing-position information.

* * * * *